United States Patent
Hiraguchi

(10) Patent No.: US 7,320,444 B2
(45) Date of Patent: *Jan. 22, 2008

(54) RECORDING TAPE CARTRIDGE

(75) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 380 days.

This patent is subject to a terminal disclaimer.

(21) Appl. No.: 11/038,175

(22) Filed: Jan. 21, 2005

(65) Prior Publication Data
US 2005/0156071 A1 Jul. 21, 2005

(30) Foreign Application Priority Data
Jan. 21, 2004 (JP) ............................. 2004-012819

(51) Int. Cl.
*G11B 23/107* (2006.01)
(52) U.S. Cl. ..................................... 242/348.2; 360/132
(58) Field of Classification Search ................ 242/348, 242/348.2; 360/132
See application file for complete search history.

(56) References Cited

U.S. PATENT DOCUMENTS

| 4,555,077 A | 11/1985 | Platter et al. |
| 5,868,333 A | 2/1999 | Nayak |
| 5,893,527 A | 4/1999 | Mizutani et al. |
| 7,077,353 B1 | 7/2006 | Veno et al. |
| 2003/0071159 A1 | 4/2003 | Hiraguchi et al. |
| 2003/0094530 A1 | 5/2003 | Hiraguchi |
| 2005/0161547 A1* | 7/2005 | Hiraguchi ................ 242/348.2 |

FOREIGN PATENT DOCUMENTS

| JP | 99/042999 A1 | 8/1999 |
| JP | 2000-11591 A | 1/2000 |
| JP | 2003-233966 A | 8/2003 |

* cited by examiner

*Primary Examiner*—John Q. Nguyen
(74) *Attorney, Agent, or Firm*—Sughrue Mion, PLLC

(57) ABSTRACT

A recording tape cartridge including at least a door opening and closing an opening by rotating around a supporting shaft provided at a front wall side; an allowing portion formed in the door, which allows avoidance of contact between the door and a distal end surface of a leader tape when the door closes the opening; and a guide portion formed at the allowing portion, and abutting the distal end portion of the leader tape, and formed to be thick-walled in a direction of making the distal end portion of the leader tape move away from the side wall. When the door closes the opening of the recording tape cartridge, a predetermined clearance is ensured between the distal end surface of the leader tape and a deepest surface of the allowing portion.

2 Claims, 6 Drawing Sheets

RECORDING TAPE CARTRIDGE

CROSS REFERENCE TO RELATED APPLICATION

This application claims priority under 35 USC 119 from Japanese Patent Application No. 2004-012819, the disclosure of which is incorporated by reference herein.

BACKGROUND OF INVENTION

1. Field of the Invention

The present invention relates to a recording tape cartridge accommodating, within a case, a single reel on which is wound a recording tape, such as a magnetic tape or the like, which is used as a recording/reproducing medium mainly for computers or the like.

2. Description of the Related Art

Conventionally, recording tape cartridges have been known in which a recording tape, such as a magnetic tape or the like, which is used as a data recording/reproducing medium for computers or the like, is wound on a single reel, and the reel is rotatably accommodated within a case. The case of this recording tape cartridge is formed substantially in the shape of a rectangular box by an upper case and a lower case, which are substantially tray-shaped, being joined together in a state in which the peripheral walls thereof abut one another.

In this recording tape cartridge, a leader member, such as a leader tape, a leader pin, a leader block, or the like, is fixed to an end portion of the recording tape. Due to a pull-out member of a drive device pulling the leader member out, the recording tape is pulled-out from the interior of the case. The pull-out member is often provided at the side portion of a loading opening into which the recording tape cartridge is loaded. Therefore, the opening of the recording tape cartridge for the pulling-out of the leader member (the recording tape) is often formed at the corner portion of the case.

When the leader member is a leader tape or a leader pin, a door which opens and closes the opening is provided. Namely, in the case of a leader tape, the opening is opened and closed by, for example, a door which is supported so as to be able to rotate around a supporting shaft provided at a front wall side (see, for example, Japanese Patent Application Laid-Open (JP-A) No. 2000-11591). In the case of a leader pin, the opening is opened and closed by, for example, a door which is slidably supported at a side wall side.

When the leader member is a leader tape, there are cases in which the leader tape is disposed along the side wall of the case. In such a case, because the pull-out member of the drive device engages (grasps) the leader tape from the side wall side, the opening for the pulling-out of the leader tape (the recording tape) is formed from a corner portion of the case and along the side wall.

However, if the leader tape is disposed toward the rear of the case, because the length of the opening formed in the side wall extends toward the rear, a problem arises in that the length of the door becomes that much longer. Namely, when the door rotates in order to open the opening, the problem arises that the door interferes with the pull-out member or the like of the drive device, and, as a result, is unable to open. Accordingly, it is preferable to dispose the leader tape toward the front such that the distal end surface thereof is as close as possible to the corner portion.

However, when the leader tape is disposed toward the front, a problem arises in that the leader tape interferes with (contacts) the door. Namely, jutting portions, which are formed in a vicinity of the distal end of the leader tape, are held by being accommodated (inserted) in accommodating recesses formed in the upper case and the lower case. However, at the time when the door closes the opening, if the distal end surface of the leader tape is held at a position at which it interferes with (contacts) the door, because the leader tape is more rigid than the recording tape (the magnetic tape), the jutting portions transmit force to the longitudinal direction rear side of the recording tape and press against the closed rear wall surfaces of the accommodating recesses. A problem arises in that the distal end portion of the leader tape is nipped between the door and the accommodating recesses and deforms.

Thus, as shown in FIG. 6, an allowing portion 54, which is concave in a plan sectional view and which allows avoidance of contact between a distal end surface 52C of a leader tape 52 and a door 50 when the opening is closed, is formed at the inner surface of the door 50. Namely, by forming such an allowing portion 54, when the opening is closed, a clearance C2 of about 0.2 mm is ensured between the distal end surface 52C of the leader tape 52 and the inner surface of the door 50 (i.e., the allowing portion 54), and interference (contact) between the leader tape 52 and the door 50 is avoided.

However, when the opening is closed, the front-back direction joggling of the door 50 with respect to the case is about 0.2 mm. Accordingly, even if this clearance C2 is ensured, if impact is applied to the door 50 due to dropping or the like, there is the concern that the distal end surface 52C of the leader tape 52 will interfere with (contact) the inner surface of the door 50 (the allowing portion 54).

The allowing portion 54 cannot be made any deeper because a deeper allowing portion 54 would lower the rigidity of the door 50. Namely, the plate thickness of the door 50 is set to be constant, so that the door 50 does not project out from the case in plan view at the time when the door 50 closes the opening. Thus, by forming the allowing portion 54, a plate thickness D2 of the most thin-walled portion of the door 50 is already less than 0.6 mm. Accordingly, if the allowing portion 54 is formed to be deeper than this, the rigidity of the door 50 cannot be ensured.

SUMMARY OF TE INVENTION

An object of the present invention is to provide a recording tape cartridge in which interference between a door and a leader tape can be reliably avoided, while the rigidity of the door is ensured.

A recording tape cartridge of a first aspect of the present invention includes a case rotatably accommodating a single reel on which a recording tape is wound; a leader tape attached to an end portion of the recording tape, and disposed along a side wall of the case; an opening for pulling-out of the leader tape, the opening being formed at a corner portion of the case which corner portion extends over respective portions of a front wall and the side wall of the case; a door, whose a most thin-walled portion has a thickness of 0.6 mm or greater, and which opens and closes the opening by rotating around a supporting shaft provided at a front wall side; an allowing portion formed in the door so that a deepest surface thereof is formed in a circular-arc shape as seen in plan sectional view, the allowing portion allowing avoidance of contact between the door and a distal end surface of the leader tape when the door closes the opening; and a guide portion formed at the allowing portion, and abutting a distal end portion of the leader tape, which is further forward than a hole portion engaged by a pull-out member of a drive device, and formed to be thick-walled in a direction of making the distal end portion of the leader tape move away from the side wall, wherein, when the door closes the opening, a predetermined clearance is ensured between the distal end surface of the leader tape and the deepest surface of the allowing portion.

A recording tape cartridge of a second aspect of the present invention includes a case rotatably accommodating a single reel on which a recording tape is wound; a leader tape attached to an end portion of the recording tape, and disposed along a side wall of the case; an opening for pulling-out of the leader tape, the opening being formed at a corner portion of the case which corner portion extends over respective portions of a front wall and the side wall of the case; a door, whose a most thin-walled portion has a thickness of 0.6 mm or greater, and which opens and closes the opening by rotating around a supporting shaft provided at a front wall side; an allowing portion formed in the door so that a deepest surface thereof is formed in a circular-arc shape as seen in plan sectional view, the allowing portion allowing avoidance of contact between the door and a distal end surface of the leader tape when the door closes the opening; and a guide portion formed at the allowing portion, and abutting a distal end portion of the leader tape, which is further forward than a hole portion engaged by a pull-out member of a drive device, and formed to be thick-walled in a direction of making the distal end portion of the leader tape move away from the side wall, wherein, when the door closes the opening, a clearance, which is greater than or equal to 0.5 mm, is ensured between the distal end surface of the leader tape and the deepest surface of the allowing portion.

Because, when the door closes the opening, the predetermined clearance, which is greater than or equal to 0.5 mm, between the distal end surface of the leader tape and the deepest surface of the allowing portion is ensured, the distal end surface of the leader tape does not contact the door, even when joggling of the door with respect to the case is taken into consideration. Namely, interference between the two can be reliably avoided.

A guide portion, which is formed to be thick-walled in a direction of making the abutting distal end portion of the leader tape move away from the side wall, is formed at the allowing portion. Therefore, the allowing portion is formed to be relatively shallow. Accordingly, the rigidity of the door can be ensured because it is possible to make the plate thickness of the most thin-walled portion of the door, where the allowing portion is formed, thick so as to be greater than or equal to 0.6 mm.

The distal end portion of the leader tape, which the guide portion abuts, is further forward than the hole portion which is engaged by the pull-out member of a drive device. Therefore, problems such as the pull-out member of the drive device not being able to engage with hole portion of the leader tape do not arise. Because the deepest surface of the allowing portion is formed in a circular-arc shape as seen in plan sectional view, this portion is not undercut when the door formed of resin is molded in a mold. Accordingly, molding of the door is facilitated.

As described above, in accordance with the present invention, there is provided a recording tape cartridge in which interference between a door and a leader tape can be reliably avoided, while the rigidity of the door is ensured.

DETAILED DESCRIPTION OF THE INVENTION

Figure 1:
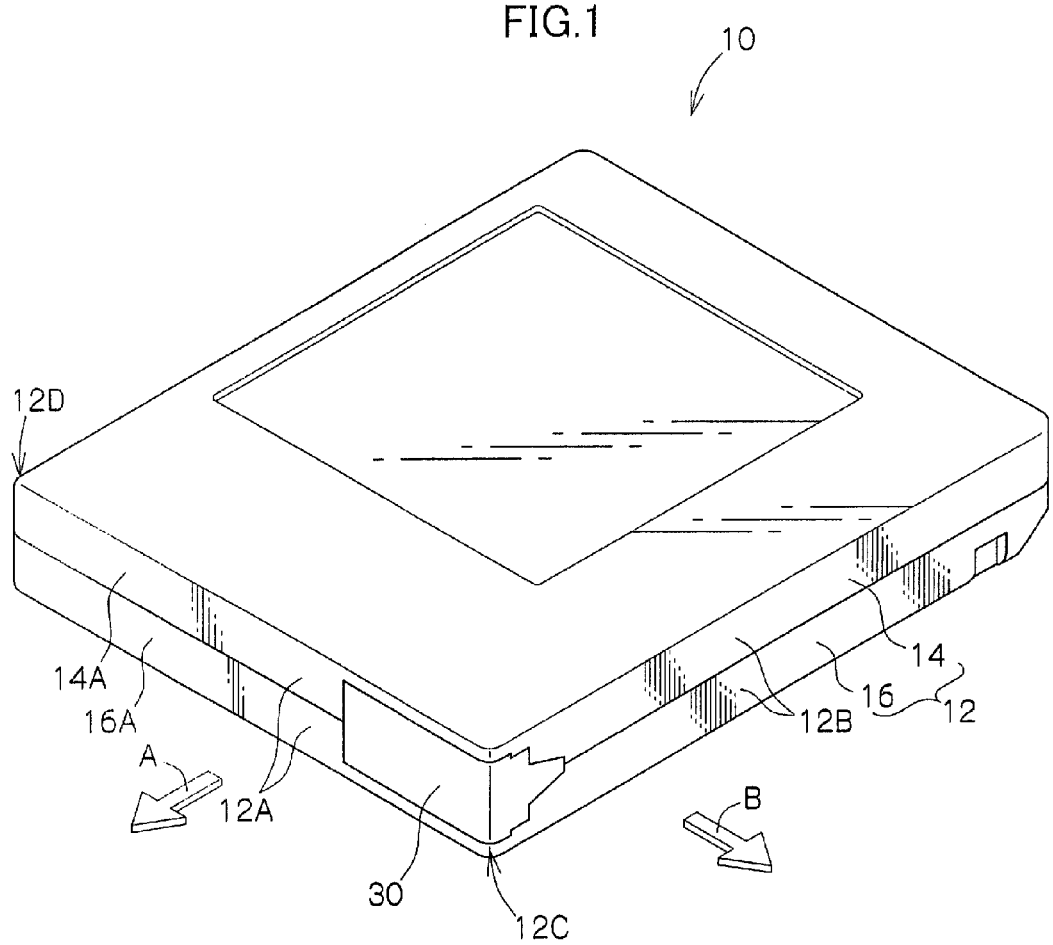
FIG. 1 is a schematic perspective view of a recording tape cartridge.

An embodiment of the present invention will be described in detail hereinafter on the basis of the drawings. Note that, for convenience of explanation, the direction of loading a recording tape cartridge into a drive device is denoted by arrow A, and this direction is the front direction. Further, arrow B denotes the leftward direction, and the front, back, left, right, top and bottom will be expressed by using these directions as reference. However, when arrows LE and RI showing the left and right directions are used in the drawings, the left side and the right side will be expressed in accordance therewith.

As shown in FIG. 1, a recording tape cartridge 10 has a case 12 which is formed substantially in the shape of a rectangular box. The case 12 is structured by an upper case 14 and a lower case 16, which are formed of a resin such as PC or the like, being joined together by ultrasonic welding or screws or the like in a state in which peripheral walls 14A, 16A thereof abut one another.

Figure 2:
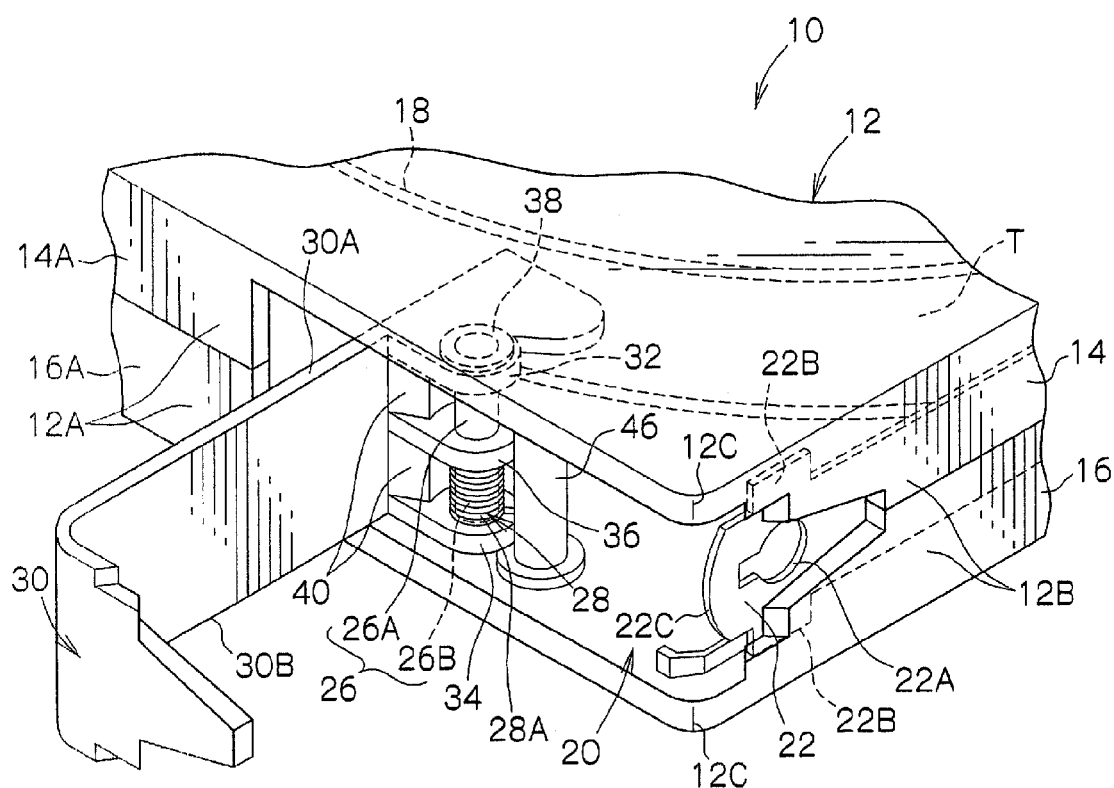
FIG. 2 is a schematic perspective view of a vicinity of an opening of the recording tape cartridge.

Further, as shown in FIG. 2, a single reel 18 is rotatably accommodated within the case 12. A recording tape T, such as a magnetic tape or the like, which serves as an information recording/reproducing medium, is wound around the reel 18. A reel gear is formed in an annular form in the bottom surface of the reel 18, and is exposed from a gear opening formed in the lower case 16.

An opening 20, which is for the pulling-out to the exterior of the recording tape T wound on the reel 18, is formed in a vicinity of a front left corner portion 12C of the recording tape cartridge 10. Namely, the opening 20 is formed so as to extend over respective portions of a front wall 12A and a left side wall 12B which are adjacent to the corner portion 12C. A leader tape 22, which is fixed to an end portion of the recording tape T and is disposed along the left side wall 12B, is pulled-out from the opening 20.

"Corner portion" in the present invention means the ridge line portion of intersection at a substantially right angle or an obtuse angle as seen in plan view, at the peripheral walls 14A, 16A of the substantially rectangular box shaped case 12. Accordingly, the corner portion 12C in this case indicates the ridge line portion where the front wall 12A and the left side wall 12B intersect substantially at a right angle as seen in plan view. Note that there are cases in which the opening 20 is provided in a vicinity of a front right corner portion 12D.

The leader tape 22 is a pulled-out member which a pull-out member of a drive device engages in order to pull-out the recording tape T. A hole 22A, with which the pull-out member engages, is formed in a vicinity of the distal end of the leader tape 22. Jutting portions 22B, which respectively jut-out in the vertical direction, are formed at the top and bottom sides of the leader tape 22 at a region which is slightly more rearward than the distal end of the hole 22A (i.e., in a vicinity of the distal end of the leader tape 22).

Figure 3:
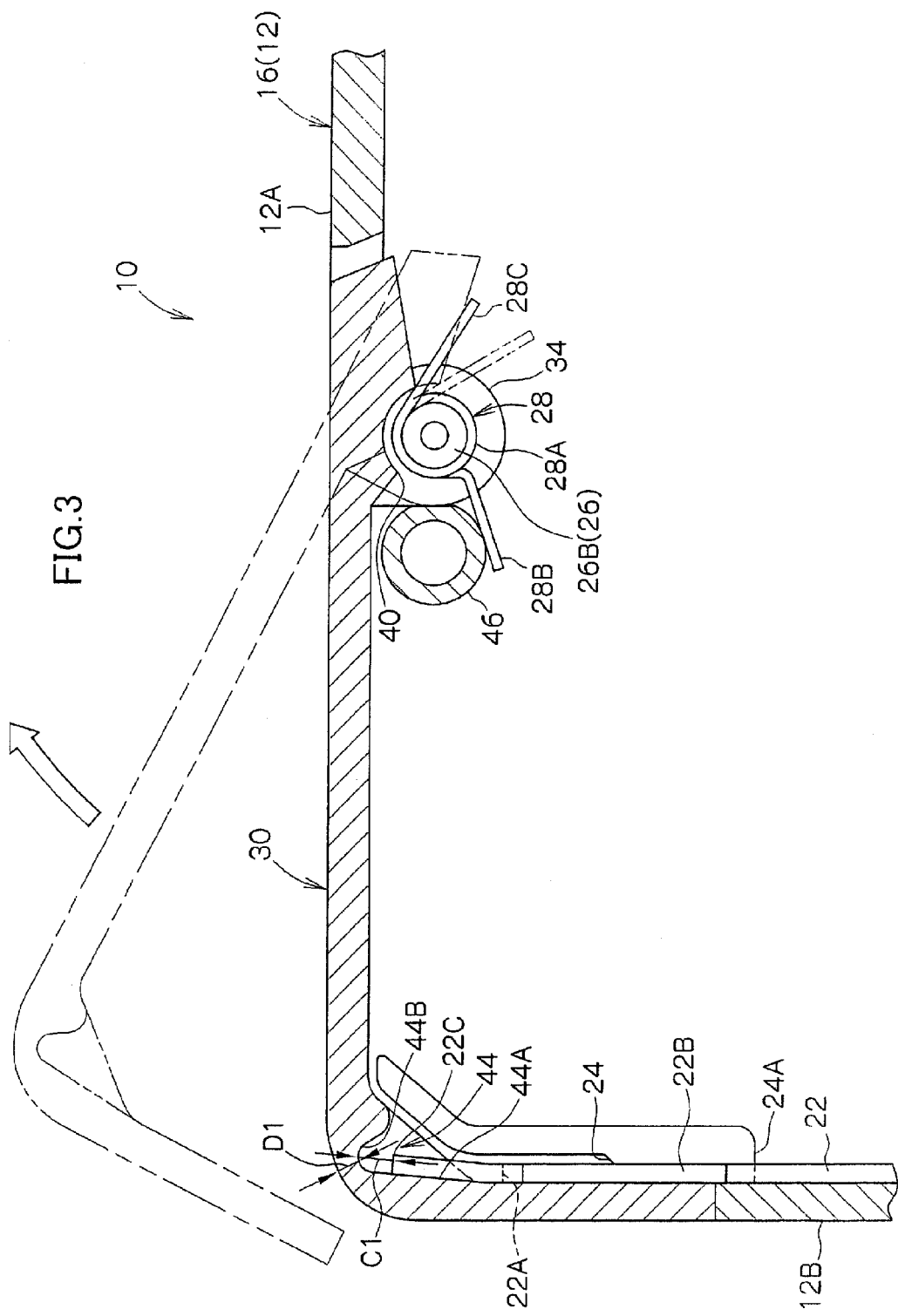
FIG. 3 is a schematic plan sectional view of the vicinity of the opening of the recording tape cartridge.

The leader tape 22 is held within the case 12 due to the jutting portions 22B being accommodated (inserted) in accommodating recesses 24 which are formed in the inner surface of the upper case 14 and the inner surface of the lower case 16, respectively. Namely, as shown in FIGS. 2 and 3, the accommodating recesses 24 are formed along the left side wall 12B. The front sides of the accommodating recesses 24 are open facing the opening 20, and the rear sides thereof are closed by rear walls 24A. Accordingly, the leader tape 22 is disposed along the left side wall 12B in a state in which the positions of the jutting portions 22B are restricted by the rear walls 24A.

As shown in FIGS. 1 through 3, when the recording tape cartridge 10 is not in use, the opening 20 is closed by a door 30. The door 30 is formed in a substantial "L" shape as seen in plan view, of substantially the same configuration and size as the opening 20. It is preferable that the door 30 be molded from an olefin resin such as POM or the like. However, the door 30 may be molded from a resin such as PC or the like, or a metal such as SUS or the like.

A supporting shaft 26, which is the fulcrum of rotation of the door 30, projects at the front wall 12A sides of the upper case 14 and the lower case 16, respectively. The upper case 14 side of the supporting shaft 26 is a hollow-cylindrical boss 26A, and the lower case 16 side thereof is a solid-cylindrical boss 26B. The supporting shaft 26 is structured by the distal end (top end) of the boss 26B at the lower case 16 side being fit into the boss 26A at the upper case 14 side. Accordingly, the diameter of the boss 26B is slightly smaller than the diameter of the boss 26A.

Three, flat-plate-shaped rotating sliding portions 32, 34, 36 project in parallel from the inner surface of the door 30 in a vicinity of the right end portion (a position which is offset by a predetermined distance toward the left from the right end portion). These rotating sliding portions 32, 34, 36 respectively project from the top and bottom both end portions of the inner surface of the door 30, and from an intermediate portion which is slightly below the center. Through holes 32A, 34A, 36A, in which the supporting shaft 26 is fit with play, are formed in the rotating sliding portions 32, 34, 36, respectively (see FIG. 5). Accordingly, the door 30 is supported rotatably by the supporting shaft 26 being inserted through the through holes 32A, 34A, 36A.

Annular convex portions 38 are formed around the through holes 32A, 34A at the top surface of the rotating sliding portion 32 at the upper end portion, and at the bottom surface of the rotating sliding portion 34 of the lower end portion, respectively. Due to the annular convex portions 38 contacting the upper case 14 and the lower case 16, a clearance of about 0.3 mm to 0.5 mm is formed between a top end surface 30A of the door 30 and the upper case 14, and between a bottom end surface 30B of the door 30 and the lower case 16, respectively. Projecting portions 40, which are shaped, as seen in plan sectional view, in circular-arc shapes which run along the peripheral surface of the supporting shaft 26, are formed at the inner surface of the door 30 between the rotating sliding portions 32, 34, 36.

The supporting shaft 26 is inserted through a wound portion 28A of a torsion spring 28 which always urges the door 30 in the direction of closing the opening 20. Namely, in the state of being held between the rotating sliding portion 34 at the lower end portion and the rotating sliding portion 36 at the intermediate portion, the wound portion 28A of the torsion spring 28 is fit on and attached to the boss 26B whose diameter is small. One end portion 28B side of the torsion spring 28 engages with a screw boss 46 of the case 12 (a screw boss which projects at the lower case 16). Another end portion 28C side of the torsion spring 28 engages with the right side edge portion of the projecting portion 40 which is between the rotating sliding portions 34, 36.

Figure 4:
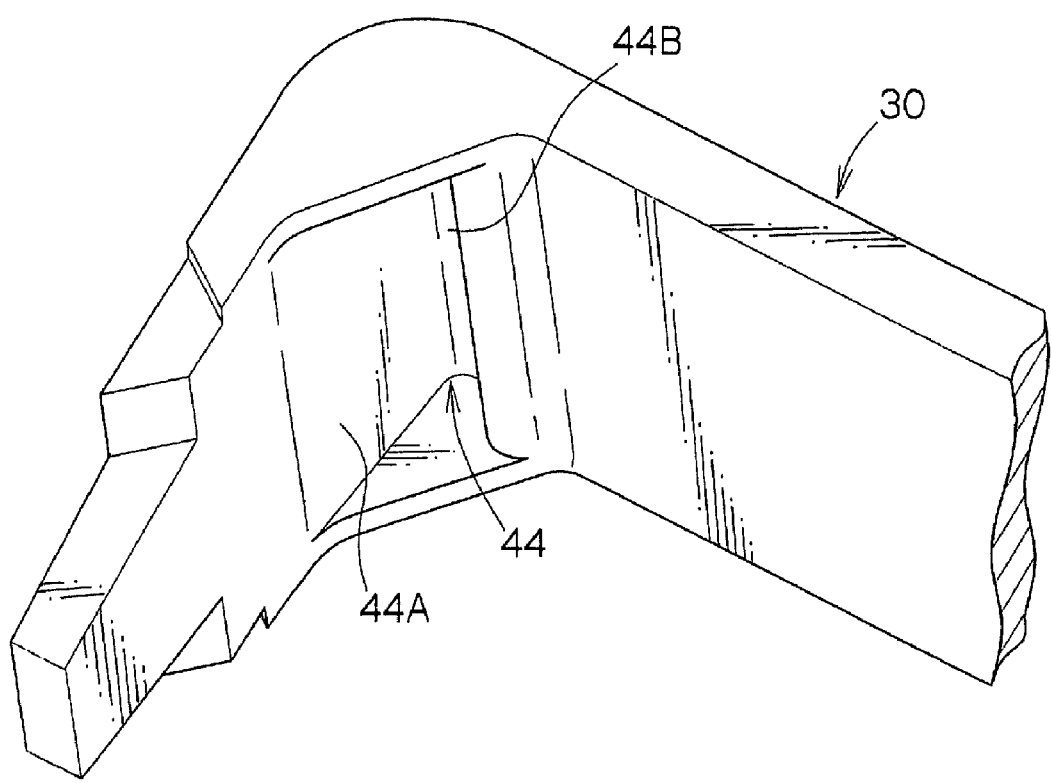
FIG. 4 is a schematic perspective view showing an allowing portion formed in a door.
Figure 5:
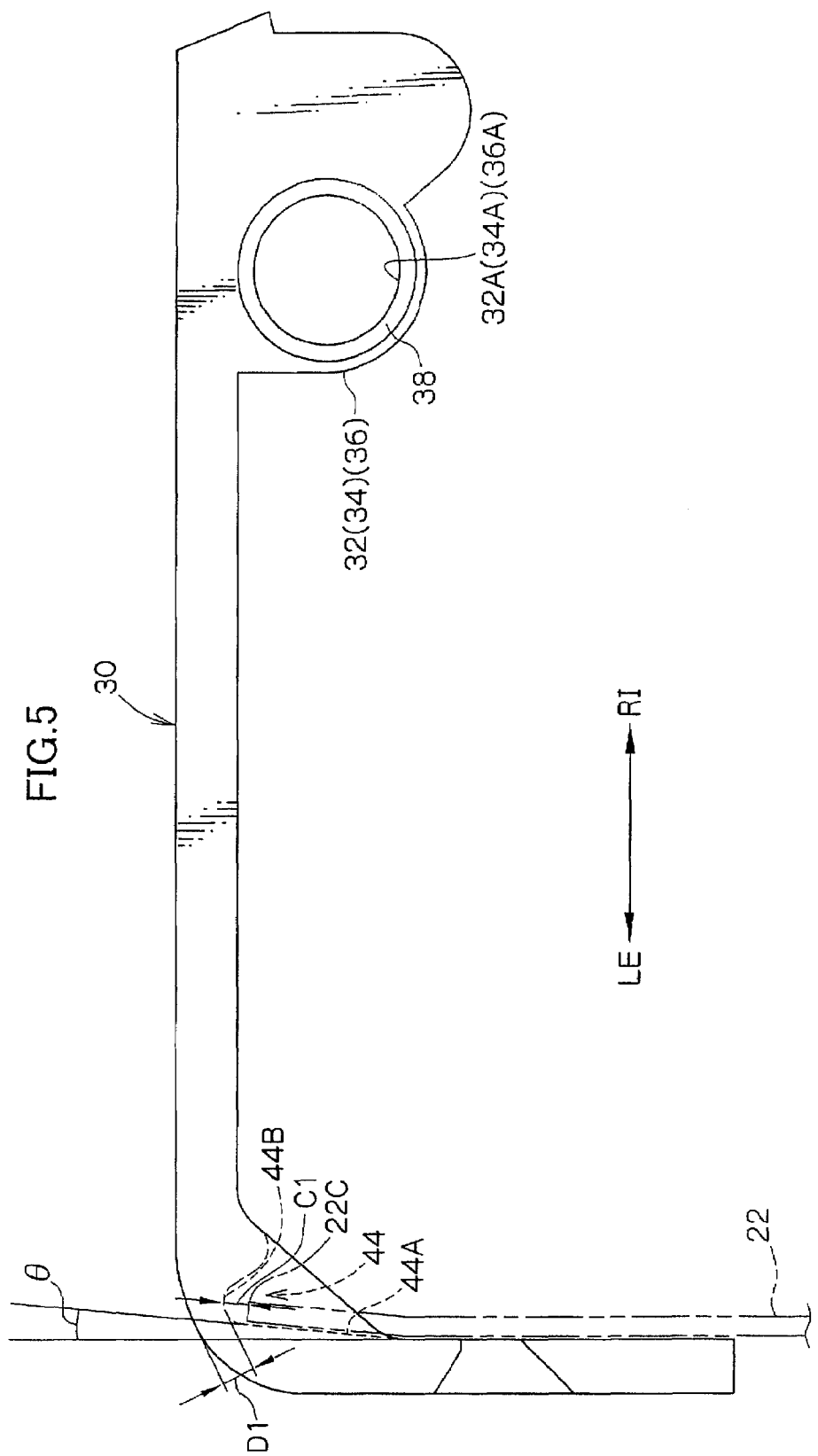
FIG. 5 is a schematic plan view of the door.

As shown in FIGS. 3 and 4, an allowing portion 44 is formed at the inner surface of the curved portion of the door 30 (the portion which is the corner portion 12C of the case 12). The allowing portion 44 is formed in the shape of a bag, and the distal end portion of the leader tape 22 (the portion of the leader tape 22 further forward than the hole 22A) enters into the allowing portion 44 when the opening 20 is closed. As shown in FIG. 5, the allowing portion 44 has a thick-walled guide portion 44A formed by the left side inner surface, as seen in plan sectional view, of the allowing portion 44 being a taper surface which is inclined (by angle θ) slightly toward the right. An inner surface 44B of the allowing portion 44 which is furthest therein hereinafter called "deepest surface 44B") is a circular-arc-shaped surface which forms a circular-arc shape as seen in plan sectional view.

Accordingly, when the opening 20 is closed, due to the left side surface of the distal end portion of the leader tape 22 abutting the guide portion 44A, the distal end portion of the leader tape 22 is displaced (flexed) slightly in the direction of moving away from (the direction of separating from) the left side wall 12B. If this guide portion 44A is provided, it is possible to form the allowing portion 44 to be relatively shallow.

Figure 6:
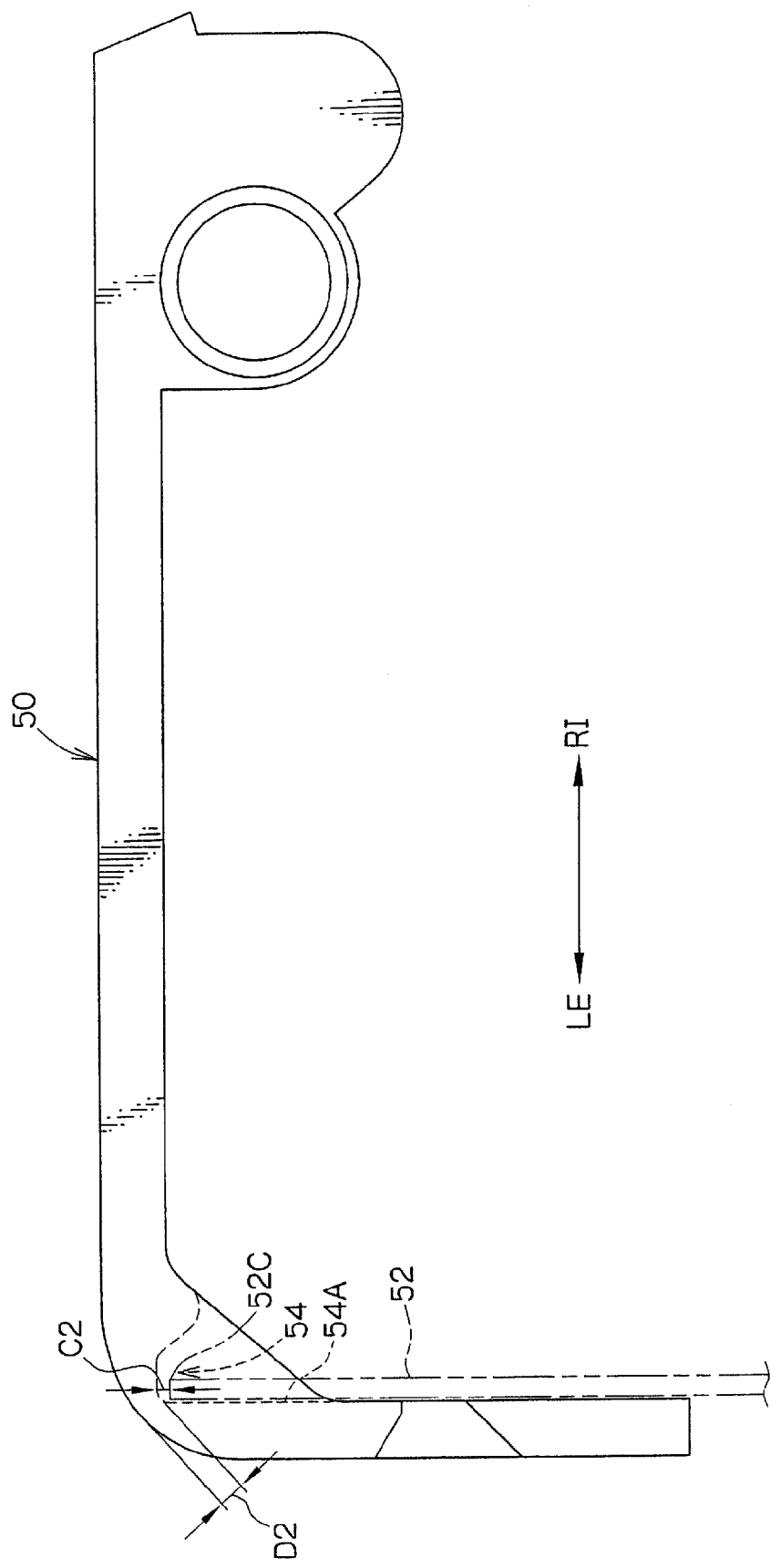
FIG. 6 is a schematic plan view of a door in a related art.

Namely, the allowing portion 44 can be formed to be more shallow than, as with the allowing portion 54 of the door 50 shown in FIG. 6, a case in which a left side inner surface 54A is a surface which is parallel to the left side wall 12B, i.e., is a surface perpendicular to the front wall 12A. Therefore, by forming the allowing portion 44, it is possible to ensure that a plate thickness D1 of the deepest surface 44B which is the most thin-walled portion, i.e., the plate thickness D1 of the most thin-walled portion of the door 30, is greater than or equal to 0.6 mm, and in this case, 0.6 mm to 0.9 mm, and preferably 0.6 nun to 1.5 mm, and more preferably 0.6 mm to 2.0 mm. Accordingly, it is possible to sufficiently ensure the rigidity of the door 30.

When the opening 20 is closed, a distal end surface 22C of the leader tape 22 always does not contact the deepest surface 44B of the allowing portion 44. Namely, as shown in FIGS. 3 and 5, a predetermined clearance C1 is always ensured between the distal end surface 22C of the leader tape 22 and the deepest surface 44B of the allowing portion 44. This clearance C1 is 0.5 mm or more. Even if an impact is applied to the door 30 due to dropping or the like, the deepest surface 44B does not interfere with (contact) the distal end surface 22C of the leader tape 22.

Namely, the door 30 closes the opening 20 with joggling (play in the rotating direction) of about 0.2 mm with respect to the case 12. Therefore, in cases such as a case in which impact is applied to the door 30 due to dropping or the like, the door 30 may rotate about 0.2 mm further in the direction of closing the opening 20. Accordingly, the clearance C1 between the two is made to be 0.5 mm or more such that, in such cases as well, the deepest surface 44B of the door 30 does not interfere with (contact) the distal end surface 22C of the leader tape 22.

Operation of the recording tape cartridge 10 having the above-described structure will now be described. When the recording tape cartridge 10 is not in use (is not loaded in a drive device), the door 30 closes the opening 20. Further, due to the jutting portions 22B of the leader tape 22 being accommodated (inserted) and held within the accommodating recesses 24, the leader tape 22 is disposed along the left side wall 12B. At this time, the distal end portion of the leader tape 22, i.e., the portion further forward than the jutting portions 22B and preferably the portion further forward than the hole 22A, is disposed in the allowing portion 44, and, by the guide portion 44A, is displaced (flexed) slightly in the direction of moving away (separating) from the left side wall 12B.

Namely, as shown in FIG. 5, the guide portion 44A is formed so as to be thick-walled in the direction of moving the distal end portion of the leader tape 22 away from the left side wall 12B as seen in plan sectional view (i.e., the inner surface at the left side of the allowing portion 44 is formed as a tapered surface which is inclined (by angle θ) slightly toward the right). The allowing portion 44 is formed so as to be relatively shallow. Accordingly, it is possible to ensure that the plate thickness D1 of the most thin-walled portion of the door 30 at the deepest surface 44B of the allowing portion 44 is greater than or equal to 0.6 mm, and in this case, 0.6 mm to 0.9 mm, and preferably 0.6 mm to 1.5 mm, and more preferably 0.6 mm to 2.0 mm. The rigidity of the door 30 is thereby ensured sufficiently.

At this time, the predetermined clearance C1 is ensured between the deepest surface 44B of the allowing portion 44 and the distal end surface 22C of the leader tape 22 which is displaced (flexed) by the guide portion 44A. Specifically, the clearance C1 is 0.5 mm or more. Accordingly, even if impact is applied to the door 30 due to dropping or the like, the distal end surface 22C of the leader tape 22 does not interfere with (contact) the deepest surface 44B of the door 30.

Namely, because the joggling (play in the rotating direction) of the door 30 with respect to the case 12 is about 0.2 mm, even if the door 30 rotates further in the direction of closing the opening 20 due to an impact, the deepest surface 44B only approaches the distal end surface 22C of the leader tape 22 by about 0.2 mm. Accordingly, the distal end surface 22C of the leader tape 22, between the deepest surface 44B of the door 30 and which the clearance C1 of 0.5 mm or more is ensured, does not interfere with (contact) the deepest surface 44B, and problems, such as the leader tape 22 being nipped between the door 30 and the accommodating recesses 24 and deformed, do not arise.

Further, when impact caused by dropping or the like is applied to a vicinity of the corner portion 12C of the case 12, the impact force is received at the screw boss 46 and not at the supporting shaft 26. Namely, the screw boss 46 is provided independently of the supporting shaft 26, and is disposed in a vicinity of the supporting shaft 26. Therefore, it is possible to make the impact force, which is generated due to dropping or the like, be received at the screw boss 48 and not be transmitted directly to the supporting shaft 26. Accordingly, damage, deformation, and the like of the supporting shaft 26 can be prevented.

When data is to be recorded onto the recording tape T of the recording tape cartridge 10, or when data recorded on the recording tape T of the recording tape cartridge 10 is to be played-back, the recording tape cartridge 10 is loaded into a drive device. Namely, the recording tape cartridge 10 is inserted into a loading opening of a drive device from the front wall 12A side.

Accompanying this loading, the opening/closing member of the drive device relatively approaches the right end portion of the door 30, and abuts and pushes the right end portion. When the opening/closing member pushes the right end portion of the door 30 in this way, the door 30 rotates in the direction of the arrow in FIG. 3 (clockwise) around the supporting shaft 26 against the urging force of the torsion spring 28, and opens the opening 20. At this time, clearances of about 0.3 mm to 0.5 mm are formed by the annular convex portions 38, between the top end surface 30A of the door 30 and the upper case 14, and between the bottom end surface 30H of the door 30 and the lower case 16. Namely, the only portions of the door 30 which contact the upper case 14 and the lower case 16 are the annular convex portions 38. Accordingly, the door 30 can rotate with little sliding resistance.

At the door 30, it is preferable that at least the rotating sliding portions 32, 34, 36 and the annular convex portions 38 are molded of an olefin resin such as POM or the like. In this way, the sliding resistance with rest to the upper case 14 and the lower case 16, which are molded of a resin such as PC or the like, can be decreased even more, and the sliding resistance with respect to the supporting shaft 26 also can be decreased.

Because the wound portion 28A of the torsion spring 28 is disposed between the rotating sliding portions 34, 36, if the rotating sliding portions 34, 36 are molded of an olefin resin such as POM or the like, they are more difficult to be scraped than the case 12 which is molded of a resin such as PC or the like. Namely, even if the wound portion 28A of the torsion spring 28 slides due to the rotation of the door 30, it is difficult for abrasion powder or the like to arise. Accordingly, the recording tape T is not adversely affected.

Further, because the deepest surface 44B of the allowing portion 44 is formed in a circular-arc shape (as a circular-arc-shaped surface) as seen in plan sectional view, if the door 30 is molded of resin, the allowing portion 44 is not undercut. Accordingly, the door 30 having the bag-shaped allowing portion 44 can be easily molded by a mold for injection molding.

In any case, when the door 30 rotates and the opening 20 is opened, the distal end portion (left side surface) of the leader tape 22 separates from the guide portion 44A. Due to the elasticity which the leader tape 22 itself has, this distal end portion is restored to its original, completely straight state. Then, the pull-out member of the drive device approaches the opening 20 from the left side wall 12B side, and engages with the hole 22A in the leader tape 22.

At this time, because the rear side of the leader tape 22 including the hole 22A is standing-by in a state of being extremely near to the left side wall 12B, the pull-out member can reliably engage the hole 22A. Namely, the distal end portion of the leader tape 22, which is displaced (flexed) by the guide portion 44A, is further forward than the hole 22A. Therefore, problems in the pull-out member engaging the hole 22A, and the like do not arise.

When the pull-out member engages the hole 22A, due to the pullout member moving away from the opening 20, the leader tape 22 is pulled-out from the interior of the case 12. Then, the leader tape 22 which is pulled-out from the interior of the case 12 is wound around a take-up reel of the drive device.

On the other hand, a driving gear of the drive device enters in from the gear opening and meshes with the reel gear of the reel 18 of the recording tape cartridge 10. Accordingly, due to the take-up reel and the reel 18 rotating synchronously, the recording tape T is successively fed-out toward the drive device, and data is recorded on the recording tape T or data recorded on the recording tape T is played-back by a recording/reproducing head of the drive device.

Thereafter, when the recording tape cartridge 10 is to be removed from the drive device, first, the reel 18 is rewound such that the leader tape 22 is undone from the take-up reel, and is returned to the interior of the case 12 from the opening 20. Then, the jutting portions 22B are accommodated (inserted) in the accommodating recesses 24, and are held at predetermined positions within the case 12. Further, after the meshing of the reel gear and the driving gear is released, the recording tape cartridge 10 is discharged out from the loading opening. Accompanying this discharge operation, the opening/closing member moves away from the right end portion of the door 30.

Thus, due to the urging force of the torsion spring 28, the door 30 rotates in the direction opposite the arrow shown in FIG. 3 (i.e., counterclockwise) around the supporting shaft 26, and closes the opening 20. Then, the distal end portion of the leader tape 22, i.e., the portion thereof further forward of the jutting portions 22B and preferably the portion thereof further forward of the hole 22A, enters into the allowing portion 44. Due to the guide portion 44A, this distal end portion is displaced (flexed) in a direction of moving away (separating) from the left side wall 12B.

Here, the amount of displacement (amount of flexure) of the distal end portion of the leader tape 22 is extremely small. Namely, the more the inclination angle δ of the guide portion 44A is increased (i.e., the more the amount of displacement (the amount of flexure) of the distal end portion of the leader tape 22 is increased), the more shallow the allowing portion 44 can be made, and the thicker the plate thickness D1 of the most thin-walled portion of the door 30 can be formed. However, from the standpoint of the structure of the recording tape cartridge 10, because the pull-out member of the drive device cannot enter deeply into the case 12, it is preferable that the leader tape 22 be disposed so as to be extremely close to the left side wall 12B in which the opening 20 is formed.

Accordingly, it is preferable that the distal end portion of the leader tape 22 which is displaced (flexed) be further forward of the hole 22A which the pullout member engages. Further, it is preferable that the amount of displacement (the amount of flexure) be small to the extent that the engaging of the hole 22A by the pullout member not be adversely affected.

What is claimed is:

1. A recording tape cartridge comprising:
a case rotatably accommodating a single reel on which a recording tape is wound;
a leader tape attached to an end portion of the recording tape, and disposed along a side wall of the case;
an opening for pulling-out of the leader tape, the opening being formed at a corner portion of the case, which corner portion extends over respective portions of a front wall and the side wall of the case;
a door, whose most thin-walled portion has a thickness of 0.6 mm or greater, and which opens and closes the opening by rotating around a supporting shaft provided at a front wall side;
an allowing portion formed in the door so that a deepest surface thereof is formed in a circular-arc shape as seen in plan sectional view, the allowing portion allowing avoidance of contact between the door and a distal end surface of the leader tape when the door closes the opening; and
a guide portion formed at the allowing portion, and abutting a distal end portion of the leader tape, which is further forward than a hole portion engaged by a pull-out member of a drive device, and formed to be thick-walled in a direction of making the distal end portion of the leader tape move away from the side wall,
wherein, when the door closes the opening, a predetermined clearance is ensured between the distal end surface of the leader tape and the deepest surface of the allowing portion.

2. A recording tape cartridge comprising:
a case rotatably accommodating a single reel on which a recording tape is wound;
a leader tape attached to an end portion of the recording tape, and disposed along a side wall of the case;
an opening for pulling-out of the leader tape, the opening being formed at a corner portion of the case, which corner portion extends over respective portions of a front wall and the side wall of the case;
a door, whose most thin-walled portion has a thickness of 0.6 mm or greater, and which opens and closes the opening by rotating around a supporting shaft provided at a front wall side;
an allowing portion formed in the door so that a deepest surface thereof is formed in a circular-arc shape as seen in plan sectional view, the allowing portion allowing avoidance of contact between the door and a distal end surface of the leader tape when the door closes the opening; and
a guide portion formed at the allowing portion, and abutting a distal end portion of the leader tape, which is further forward than a hole portion engaged by a pull-out member of a drive device, and formed to be thick-walled in a direction of making the distal end portion of the leader tape move away from the side wall,
wherein, when the door closes the opening, a clearance, which is greater than or equal to 0.5 mm, is ensured between the distal end surface of the leader tape and the deepest surface of the allowing portion.

* * * * *